United States Patent
Costa et al.

[11] Patent Number: 6,059,524
[45] Date of Patent: May 9, 2000

[54] PENETRATION RESISTANT FAN CASING FOR A TURBINE ENGINE

[75] Inventors: Mark W. Costa, Storrs; Andrew S. Foose, Ellington; Nathan D. Korn, Portland; Jan B. Kowza, Coventry; Wendy P. Lopardi, Tolland; Douglas A. Welch, Portland, all of Conn.

[73] Assignee: United Technologies Corporation, Hartford, Conn.

[21] Appl. No.: 09/062,966

[22] Filed: Apr. 20, 1998

[51] Int. Cl.[7] .................................................. F01D 25/16
[52] U.S. Cl. .................................................. 415/9; 415/200
[58] Field of Search .......................... 415/9, 200, 173.4, 415/174.4; 428/911; 442/134, 135

[56] References Cited

U.S. PATENT DOCUMENTS

| | | | |
|---|---|---|---|
| 4,500,252 | 2/1985 | Monhardt et al. | 415/9 |
| 4,534,698 | 8/1985 | Tomich | 415/9 |
| 4,547,122 | 10/1985 | Leech | 415/9 |
| 4,699,567 | 10/1987 | Stewart | 415/200 |
| 5,160,248 | 11/1992 | Clarke | 415/9 |
| 5,259,724 | 11/1993 | Liston et al. | 415/9 |
| 5,344,280 | 9/1994 | Langenbrunner et al. | 415/9 |
| 5,403,148 | 4/1995 | Forrester | 415/9 |
| 5,408,826 | 4/1995 | Stewart et al. | 60/226.1 |
| 5,431,532 | 7/1995 | Humke et al. | 415/9 |
| 5,447,411 | 9/1995 | Curley et al. | 415/9 |
| 5,482,429 | 1/1996 | Penda | 415/9 |
| 5,485,723 | 1/1996 | McCoy et al. | 60/226.1 |
| 5,516,257 | 5/1996 | Kasprow et al. | 415/9 |
| 5,516,258 | 5/1996 | Newton | 415/9 |

Primary Examiner—Edward K. Look
Assistant Examiner—Rhonda Barton
Attorney, Agent, or Firm—Kenneth C. Baran

[57] ABSTRACT

The invention is a penetration resistant turbine engine fan casing (12) for containing separated fragments of a fan blade (16). The casing includes a penetration susceptible support case (14), a penetrable covering (32) circumscribing an impact zone (I) of the support case and an optional, but highly recommended collapsible support covering (34) circumscribing the case but axially offset from the impact zone. A containment covering (36) circumscribes both the penetrable covering (32) and the support covering (34). In a preferred embodiment, the coverings are aromatic polyamide fiber fabrics and the support covering is a collapsible cellular array. In operation, a detached fragment of a fan blade penetrates through the case (14) and the penetrable covering (32), and is plastically deformed by the penetrable covering to reduce the fragment's potential for damaging the containment covering (36). The containment covering intercepts the deformed fragment, confining it to a predetermined radial envelope bounded by the inner surface (58) of a nacelle (52). The impact forces arising from a separated blade fragment cause the containment fabric to collapse the cellular array (32) and momentarily detension the containment fabric to maximize its penetration resistance.

25 Claims, 2 Drawing Sheets

6,059,524

PENETRATION RESISTANT FAN CASING FOR A TURBINE ENGINE

TECHNICAL FIELD

This invention relates to fan casings for aircraft gas turbine engines and particularly to penetration resistant fan casings for containing fragments of a fan blade.

BACKGROUND OF THE INVENTION

Modem aircraft are often powered by a propulsion system that includes a gas turbine engine housed within an aerodynamically streamlined nacelle. The major engine components include a fan section comprising a rotatable hub, an array of fan blades projecting radially from the hub and a fan casing encircling the blade array. During engine operation it is possible for a fan blade to become separated from the hub or for part of a blade, which may comprise substantially the entire blade, to become separated from the remainder of the blade. One function of the fan casing is to contain these potentially hazardous fragments.

For small diameter engines, adequate containment capability can usually be achieved with a metallic case thick enough to resist penetration by a blade fragment. However for large diameter engines, a metallic case thick enough to resist penetration is prohibitively heavy. Therefore, it is customary for manufacturers of large diameter engines to employ a fabric wrapped containment system comprising a light weight, high strength ballistic fabric such as KEVLAR® Bar (a trademark of E.I. DuPont de Nemours & Company) wrapped in multiple layers around a relatively thin, penetration susceptible support case. In operation, a separated blade fragment penetrates the support case and strikes the fabric. The fabric deflects radially, and at least some of the fabric layers remain intact to capture and contain the fragment.

Although fabric wrapped containment systems are far more weight efficient than metallic containment cases, they nevertheless add considerable weight to the engine. Furthermore, if the fabric deflects excessively, the fabric enshrouded blade fragment can strike and damage the interior of the nacelle. Therefore it is desirable to deploy the fabric on the support case in a way that minimizes weight without compromising containment capability or risking damage to the nacelle.

SUMMARY OF THE INVENTION

According to the invention, a fan casing includes a penetrable covering wrapped around an impact zone of a support case, a support covering also wrapped around the support case but axially offset from the impact zone, and a penetration resistant containment covering wrapped around both the penetrable covering and the support covering. In the event that a high energy blade fragment ruptures the support case, the penetrable covering deforms the fragment to reduce its potential for puncturing the containment covering. The containment covering then intercepts the deformed fragment, confining it to a predetermined radial envelope.

According to one aspect of the invention the penetrable covering is a fabric covering wrapped around the case with substantially no tension, the support covering is a collapsible covering, and the containment covering is a fabric covering wrapped around both the penetrable covering and the collapsible covering with a predefined tension. In operation, the impact energy of a separated blade fragment causes the containment fabric to crush or flatten the collapsible covering to momentarily introduce slack into the containment fabric. The slack partially and temporarily detensions the containment fabric to enhance its penetration resistance.

In one detailed embodiment of the invention, the penetrable fabric and the containment fabric are aromatic polyamide fiber fabrics such as KEVLAR. Forward and aft ends of the containment fabric extend axially beyond the penetrable fabric and the collapsible covering, and each end is anchored to the support case by a circumferentially extending adhesively bonded joint. During operation, the impact energy of a separated blade fragment fractures a circumferentially limited sector of at least one of the joints so that a corresponding sector of containment fabric becomes detached from the support case and is pulled axially toward the impact site. Localized fracture of the joint momentarily detensions the containment fabric to increase its penetration resistance. The joint remains intact outside the fractured sector to restrict axial translation of the detached fabric edge, ensuring that the edge does not translate far enough to expose the rupture in the support case and allow secondary debris to escape from the engine.

The invention is advantageous in that it reliably contains a high energy fan blade fragment without contributing excessively to engine weight. The invention also limits deflection of the containment fabric to minimize the risk of damage to the nacelle.

The foregoing features and advantages and the operation of the invention will become more apparent in light of the following description of the best mode for carrying out the invention and the accompanying drawings.

BEST MODE FOR CARRYING OUT THE INVENTION

Figure 1:
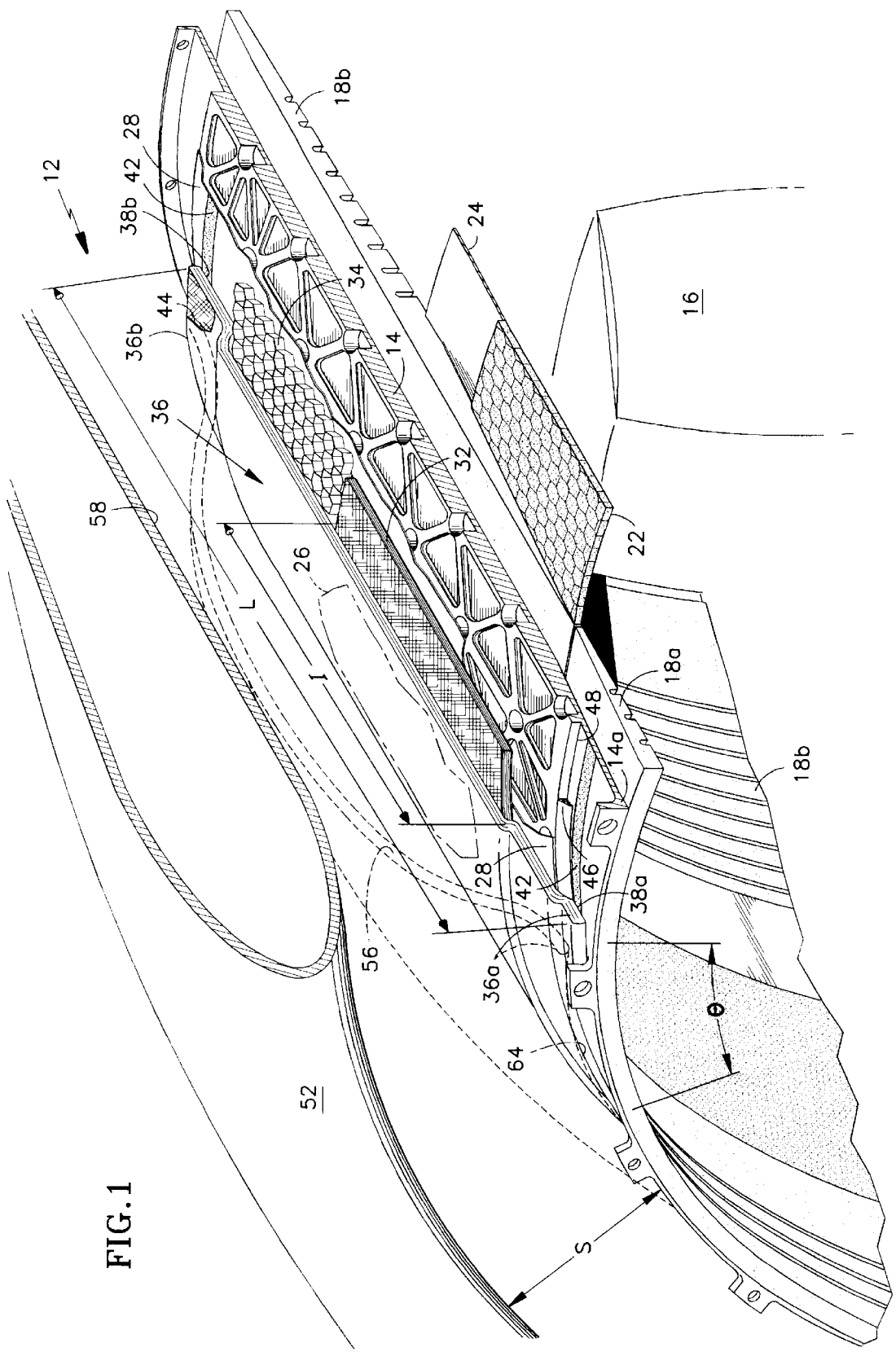
FIG. 1 is a cutaway perspective view illustrating a portion of a penetration resistant fan casing according to the present invention.

Referring to FIG. 1, a fan casing 12 for an aircraft gas turbine engine includes a ribbed aluminum support case 14 encircling an array of fan blades such as representative blade 16. Forward and aft noise attenuation panels 18a, 18b are secured to the radially inner surface of the case, and an abradable rubstrip 22 extends axially between the noise attenuation panels outboard of the fan blades. When a new or newly refurbished engine is first operated, the blade tips carve a trench (not shown) into the rubstrip. Thereafter, the blade tips extend into the trench during engine operation to minimize air leakage around the blade tips. An ice shield 24 protects the aft noise attenuation panels from impact damage due to any accumulated ice cast off by the blades. In the event that a fragment of a fan blade becomes separated from the remainder of the blade, the fragment is expected to strike the support case at an impact site 26 situated in an axially extending impact zone I.

A thin aluminum face sheet 28 is adhesively bonded to the ribs on the outside of the support case, and a penetrable covering 32 is wrapped around the face sheet so that the penetrable covering circumscribes the impact zone I of the support case 14. The penetrable covering is a continuous belt of an aromatic polyamide fiber fabric such as KEVLAR wrapped around the support case with the warp fibers extending circumferentially and the weft or fill fibers extending axially. The fabric properties include a thickness of about 0.070 to 0.087 inches (1.78 to 2.21 millimeters), a weight per unit area of about 32.1 to 33.5 ounces per square yard (1090 to 1138 grams per square meter), a minimum breaking strength of about 1175 pounds per inch of width (210 kilograms per centimeter of width) in the warp direction and a minimum breaking strength of about 2600 pounds per inch of width (465 kilograms per centimeter of width) in the fill direction. Six layers of the fabric are wrapped continuously around the support case with substantially no tension in the fabric.

A light weight support covering 34, axially offset from the impact zone, also circumscribes the support case. Preferably the support covering is a collapsible covering such as a phenolic coated, fibrous aramid base cellular array conforming to SAE Aerospace Material Specification 3711B (Aerospace Material Specifications are available from the Society of Automotive Engineers, Inc., 400 Commonwealth Drive, Warrendale, Pa. 15096).

A penetration resistant containment covering 36 circumscribes both the penetrable covering 32 and the support covering 34. The containment covering is a continuous belt of an aromatic polyamide fiber fabric such as Kevlar oriented with the warp fibers extending circumferentially and the fill fibers extending axially. The properties of the containment fabric differ from those of the penetrable fabric 32. In particular the containment fabric weight per unit area is about 6.2 to 7.2 ounces per square yard (210 to 244 grams per square meter), considerably lower than the weight per unit area of the penetrable fabric. The containment fabric properties also include a thickness of about 0.011 to 0.015 inches (0.28 to 0.38 millimeters), and a minimum breaking strength of about 600 pounds per inch of width (107 kilograms per centimeter of width) in both the warp and fill directions. Fifty layers of the fabric are wrapped continuously around the support case at a predefined circumferential tension of about ten pounds per inch (1.8 kilograms per centimeter) of fabric axial length L. For example the axial length L of the illustrated containment fabric is about 43 inches (109 centimeters) and so the fabric is tensioned to about 430 pounds (196 kilograms).

The containment fabric 36 has forward and aft ends 36a, 36b situated axially beyond the penetrable fabric and the collapsible covering. Forward end 36a is situated axially forwardly of the penetrable fabric 32 and aft end 36b is situated aftwardly of the collapsible covering 34. At least one and preferably both of the ends 36a, 36b are anchored to the support case 14 by a circumferentially continuous joint 38a, 38b effected by an epoxy adhesive bonding agent 42. The joint prevents the fabric from creeping axially out of place during engine assembly and operation. Suitable bonding agents include type EA9628 adhesive available from Dexter Corporation's Hysol Division, Pittsburg, Calif. and type AF163K adhesive available from 3M's Adhesives, Coatings & Sealers Division, St. Paul, Minn. A thin coating of the bonding agent is also applied to the outermost surface of the containment fabric and cured to form a moisture repellant skin 44. The skin is an environmental seal that guards against water infiltration into the containment fabric and penetrable fabric. Without such a seal, the fabrics can absorb and retain appreciable quantities of water (e.g. rain or water vapor from humid air), adding detrimentally to engine weight.

Figure 2:
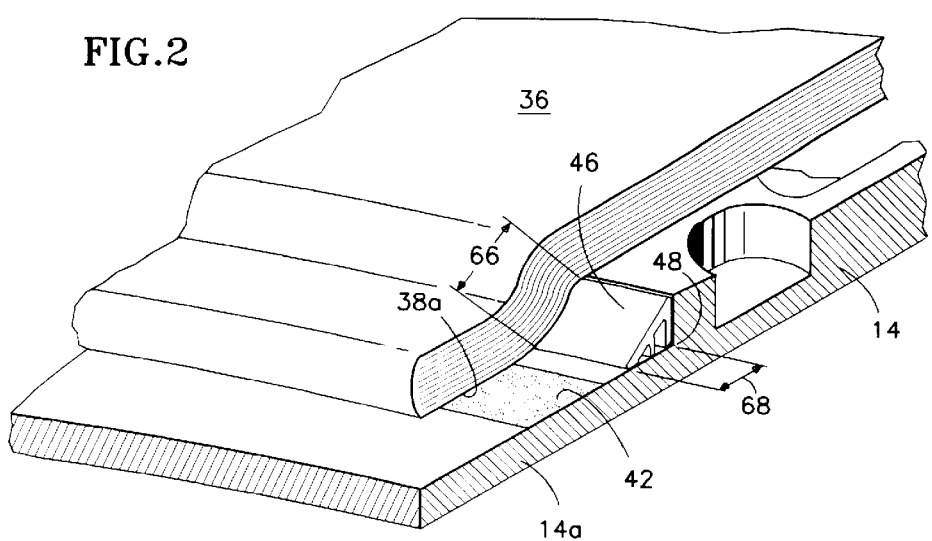
FIG. 2 is a perspective view illustrating a portion of a filler wedge used in the fan casing of FIG. 1.

The casing 12 also includes a circumferentially extending silicone rubber filler wedge 46 (seen best in FIG. 2) nested in a corner 48 of the support case 14 and trapped radially between the case 14 and the containment fabric 36. The filler wedge supports the containment fabric 36 across the radial step between the ribbed portion of the support case and the thinner, flanged extension 14a. The filler wedge also limits the axial extent of the joint 38a because the bonding agent does not readily adhere to the silicone rubber and therefore does not bond the containment fabric to the outermost surface of the wedge.

When a gas turbine engine that includes fan casing 12 is installed on an aircraft, the engine is part of a propulsion system that includes an aerodynamically streamlined nacelle 52. The forward portion of the nacelle circumscribes and is radially spaced from the casing. It is desirable for the radial spacing S between the casing and the nacelle to be as small as possible to minimize the weight and bulk of the propulsion system.

The above described fan casing is designed to withstand the impact of a blade fragment, which may comprise substantially the entire blade, ejected when the fan is operating at a high rotational speed. During such an occurrence, the blade fragment opens a rupture in the support case and face sheet at an impact site 26 situated axially within the impact zone I. The fragment then penetrates through the penetrable fabric 32. The penetrable fabric causes the fragment to buckle or otherwise plastically deform so that sharp edges on the fragment are blunted and the surface area of the fragment in contact with the fabric is increased. In effect, the penetrable fabric 32 preconditions the fragment to reduce its potential for inflicting damage on the containment fabric 36.

After the deformed fragment penetrates completely through the penetrable fabric, it is intercepted by the penetration resistant containment fabric 36. The fragment typically cuts through many or most of the containment fabric layers, however at least one of the layers remains intact. The intact layers elongate and deflect radially outwardly, as suggested by the interrupted lines 56, to intercept and confine the deformed fragment to a predetermined radial envelope bounded by inner surface 58 of nacelle 52. As a result, the fabric enshrouded fragment is prohibited from striking and damaging the nacelle.

Figure 3:
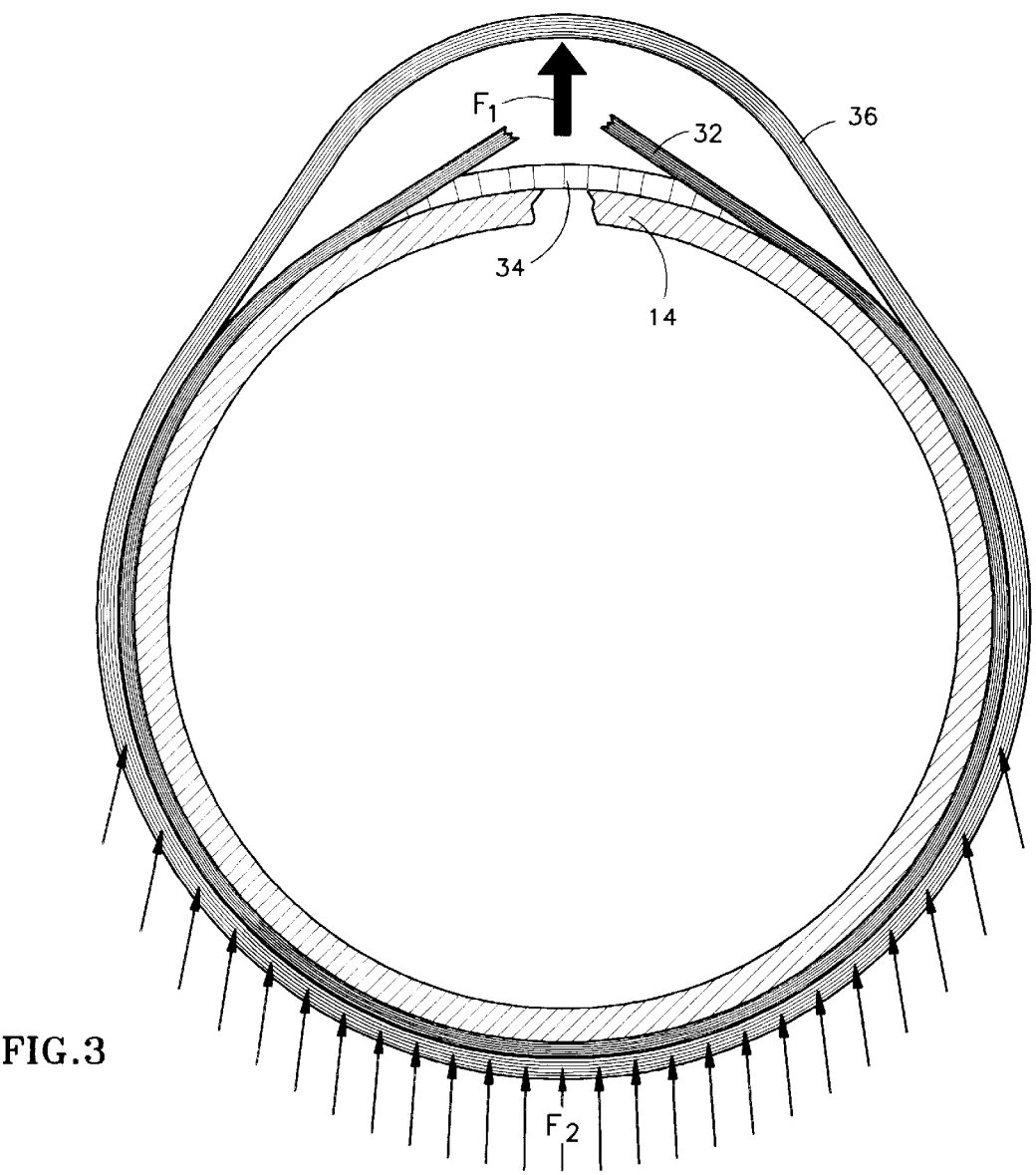
FIG. 3 is a schematic illustration, showing force transferral from a containment covering to a collapsible covering.

The containment fabric's penetration resistance is enhanced by the collapsible cellular array 34. When a blade fragment strikes the containment fabric, the fabric acts as a medium for transferring some of the impact force $F_1$ into the cellular array, as depicted schematically in FIG. 3. The transferred force $F_2$ crushes the cellular array and/or flattens the cell walls against the support case 14, defeating the cellular array's ability to radially support the containment fabric. The loss of radial support briefly introduces some slack into the containment fabric, momentarily detensioning the fabric and improving its penetration resistance. The effect is analogous to capturing a projectile with a tightly stretched membrane. If the membrane is relaxed slightly after being struck by the projectile, there is an improved likelihood of capturing the projectile without breaking the membrane.

The bonded joints 38a, 38b also contribute to the containment fabric's penetration resistance. As seen in FIG. 1, a sector θ of bond joint 38a breaks in response to the impact force $F_1$ exerted on the containment fabric. The detached edge 64 of the containment fabric is pulled axially toward the impact site, temporarily and partially detensioning the containment fabric and improving its penetration resistance. Joint 38a remains intact outside the sector θ, to prevent the detached edge from translating axially aft of the forward edge of the impact zone I thereby preventing secondary debris from escaping through the impact site rupture in the support case. In practice, either or both of joints 38a, 38b may break locally to detension the containment fabric.

In view of the above description of the invention and its operation, certain additional details of the disclosed fan casing can now be appreciated. The penetrable fabric 32 is wrapped around the support case with substantially no tension, rather than with a positive tension, to maximize the penetrable fabric's penetration resistance. As described above, this penetration resistance is not intended to be adequate for capturing a high energy fragment. However the penetration resistance of the penetrable fabric enables it to contain low energy fragments. More importantly, the penetration resistance contributes to the fabric's ability to plastically deform the fragment, which would readily cut through a highly tensioned fabric without suffering any appreciable deformation.

Conversely, the containment fabric is installed with a positive tension, rather than with little or no tension, even though the tension slightly diminishes the fabric's penetration resistance. The tension is applied because untensioned fabric would deflect excessively when struck by a blade fragment and allow the fabric enshrouded fragment to strike and damage the inner surface 58 of nacelle 52. In the illustrated fan casing the predefined tension of ten pounds per inch of axial length L is selected so that the containment fabric adequately resists penetration without requiring excessive radial spacing S to prevent damage to the nacelle.

The filler wedge 46 improves the penetration resistance of the fan casing by limiting the axial extent of bond joint 38a. If the wedge was not present, uncured bonding agent 42 would seep toward the corner 48 during assembly of the casing. As a result, the strip 66 of containment fabric that is supported by the wedge in the illustrated casing would instead become bonded to region 68 of the support case, restricting the fabric's potential for elongating. The reduced elongation potential would introduce additional tension into the fabric and compromise its penetration resistance. The filler wedge also bridges the radial step between the ribbed portion of the support case and the flanged forward extension 14a so that the containment fabric 36 can glide smoothly across the step when the fabric elongates. In the illustrated casing, precautions are not taken to limit the axial extent of aft bond joint 38b because that joint is more remote from the impact site than is the forward joint, and therefore does not have an appreciable influence on the elongation potential of the fabric.

Although the collapsible support covering 34 contributes to the penetration resistance of the fan casing 12, it may be dispensed with. However its absence will diminish the casing's containment capability unless compensatory changes are made to other components of the casing. For example, reduced installation tension in the containment fabric 36, accompanied by increased spacing S to account for anticipated increased fabric deflection, may compensate for the absence of the collapsible support. However the increased nacelle diameter may be unacceptable in view of the limited amount of space available for mounting an engine on an aircraft. Alternatively, additional fabric layers can be used to compensate for the absence of the collapsible support, but at the penalty of additional engine weight.

The invention is not limited to the above described embodiment. For example fabrics other than KEVLAR fabric may be suitable. Moreover, non-fabric materials may also be employed to first deform a blade fragment and then subsequently intercept the deformed fragment and confine it to a predetermined radial envelope. These and other changes, modifications and adaptations may be made without departing from the invention as set forth in the accompanying claims.

We claim:

1. A turbine engine fan casing for containing a separated blade fragment, comprising:

a support case having an axially extending impact zone;

a substantially structurally continuous penetrable covering circumscribing the impact zone; and a containment covering circumscribing the penetrable covering.

2. The fan casing of claim 1 wherein the penetrable covering and the containment covering are fabric coverings, the containment fabric has a forward end situated axially forwardly of the penetrable fabric, and an aft end situated axially aftwardly of the penetrable fabric, and at least one of the ends is anchored to the support case by a joint effected by a bonding agent.

3. The fan casing of claim 1 comprising a support covering circumscribing the support case and axially offset from the impact zone, and wherein the containment covering circumscribes both the penetrable covering and the support covering.

4. The fan casing of claim 1 or 3 wherein the penetrable covering deforms the separated fragment and the containment covering resists penetration and confines the deformed fragment to a predetermined radial envelope.

5. The fan casing of claim 4 wherein the predetermined radial envelope is defined by a nacelle surface that circumscribes and is radially spaced from the casing.

6. The fan casing of claim 1 or 3 wherein the penetrable covering is a fabric having a first set of properties and the containment covering is a fabric having a second set of properties.

7. The fan casing of claim 6 wherein the penetrable covering and the containment covering are aromatic polyamide fiber fabrics.

8. The fan casing of claim 6 wherein the properties of the penetrable fabric include a weight per unit area and the properties of the containment fabric also include a weight per unit area, the weight per unit area of the containment fabric being less than the weight per unit area of the penetrable fabric.

9. The fan casing of claim 6 wherein the penetrable fabric has warp direction fibers and weft direction fibers, the properties of the penetrable fabric include a breaking strength in the warp direction and a breaking strength in the weft direction, the breaking strength in the weft direction being greater than the breaking strength in the warp direction, the penetrable fabric being oriented so that the lower strength warp direction fibers extend substantially circumferentially and the higher strength weft direction fibers extend substantially axially.

10. The fan casing of claim 1 wherein the penetrable covering is a fabric wrapped around the support case with substantially no tension and the containment covering is a fabric wrapped around the penetrable fabric with a predefined tension selected so that the containment fabric resists penetration by the blade fragment and confines the fragment to a predetermined radial envelope.

11. The fan casing of claim 3 wherein the penetrable covering is a fabric wrapped around the support case with substantially no tension and the containment covering is a fabric wrapped around the penetrable fabric and the support covering with a predefined tension so that the containment fabric resists penetration by the blade fragment and confines the fragment to a predetermined radial envelope.

12. The fan casing of claim 10 or 11 wherein the containment fabric has an axial length and the predefined tension is approximately ten pounds per inch of axial length.

13. The fan casing of claim 11 wherein the support covering is a collapsible covering.

14. The fan casing of claim 13 wherein the collapsible covering is a cellular array.

15. The fan casing of claim 13 wherein the collapsible covering conforms to SAE Aerospace Material Specification 3711B.

16. The fan casing of claim 3 wherein the penetrable covering and the containment covering are fabric coverings, the containment fabric has a forward end situated axially forwardly of the penetrable fabric and an aft end situated axially aftwardly of the support covering and at least one of the ends is anchored to the support case by a joint effected by a bonding agent.

17. The fan casing of claim 2 or 16 wherein the support case includes a circumferentially extending filler wedge nested in a corner of the support case and trapped radially between the support case and the containment fabric.

18. The fan casing of claim 2 or 16 wherein the bonding agent is an epoxy adhesive.

19. The fan casing of claim 2 or 16 wherein the joint is circumferentially continuous.

20. The fan casing of claim 2 or 16 wherein the separated blade fragment penetrates the impact zone at an impact site thereby opening a rupture in the support case, and a sector of the joint breaks so that a detached edge of the containment fabric is pulled a limited distance axially toward the impact site to at least partially detention the containment fabric without exposing the rupture.

21. A turbine engine fan casing for containing a separated blade fragment that strikes the fan casing, comprising:

a support case having an axially extending impact zone;

an aromatic polyamide penetrable fabric circumscribing the impact zone with substantially no tension;

a collapsible cellular array circumscribing the support case and axially offset from the impact zone;

an aromatic polyamide, penetration resistant containment fabric circumscribing the penetrable fabric and the cellular array with a predefined tension, the containment fabric having forward and aft ends situated axially beyond the penetrable fabric and the cellular array, the forward and aft ends each being anchored to the support case by respective adhesively bonded joints; and a circumferentially extending filler wedge nested in a corner of the support case and trapped radially between the support case and the containment fabric;

wherein the penetrable covering deforms the separated blade fragment to reduce its potential for inflicting damage and the containment covering resists penetration by the deformed fragment thereby confining the fragment to a predetermined radial envelope.

22. The fan casing of claim 21 wherein a sector of at least one of the adhesively bonded joints breaks and the cellular array collapses in response to the blade fragment piercing the support case and striking the penetration resistant fabric thereby enhancing the penetration resistance of the containment fabric.

23. A method of containing a separated fan blade fragment in a turbine engine, comprising:

preconditioning the separated blade fragment to reduce its potential for inflicting damage; and intercepting the preconditioned fragment with a tensioned material capable of resisting penetration by the deformed fragment and of confining the fragment to a predetermined radial envelope.

24. The method of claim 23 wherein the step of preconditioning the fragment comprises plastically deforming the fragment.

25. The method of claim 24 wherein the step of intercepting the fragment includes at least partially detensioning the tensioned material.

* * * * *